April 14, 1970 — E. THURNER — 3,505,920

ANCHORING ELEMENTS

Filed Oct. 18, 1968

INVENTOR
ELMAR THURNER
BY
McGlew & Toren
ATTORNEYS

United States Patent Office 3,505,920
Patented Apr. 14, 1970

3,505,920
ANCHORING ELEMENTS
Elmar Thurner, Feldkirch-Gisingen, Austria, assignor to Hilti Aktiengesellschaft, Schaan, Furstentum, Germany
Filed Oct. 18, 1968, Ser. No. 768,807
Claims priority, application Germany, Nov. 2, 1967, 60,678
Int. Cl. F16b 15/00, 19/14, 39/00
U.S. Cl. 85—10                                6 Claims

ABSTRACT OF THE DISCLOSURE

Anchoring elements such as a bolt, nail or similar securing devices include a pointed tip portion and an elongated shank portion terminating in a head which is advantageously of a wider diameter than the shank portion and may be threaded. A feature of the construction is the provision of a colar located adjacent the head portion in a position to be engaged by a driving piston of a setting tool of a type which is adapted to be operated by an explosive charge. A driving piston of a setting tool includes an elongated bore for accommodating the long shank portion and an internal ledge which seats on the collar portion to apply a driving pressure to this portion without bending the shank portion.

SUMMARY OF THE INVENTION

This invention relates in general to the construction of a securing device and in particular to a new and useful anchoring element which is adapted to be driven into a hard receiving material such as iron or concrete and which includes an elongated shank portion and a collar adjacent the tip which provides the engagement for a driving piston of a setting tool.

The present invention relates to anchoring elements such as bolts, nails or the like which have a head, a shank and a tip. For the attachment of sectional sheets, for example, of aluminum corrugated sheets for roof coverings and fronts, it is sometimes necessary to attach the sheets at a location adjacent the wave crest of the corrugations rather than in the valley portion. For such attachments, it has been known to use bolts having a long shank portion and a head portion which is threaded. Because the sectional sheets expand when the temperature rises and contract when the temperature decreases, relatively great bending forces act on the bolt. Depending on the temperature variations, the resulting bending forces tend to become considerable over a long threaded portion and cause breakage of the bolts in the part of the thread nearest the receiving material, even before a slot forms in the sheet. For the driving of a normal threaded bolt into receiving material, it is known to employ a power driving setting tool. After the tip is driven into the hard receiving material, a threaded sleeve is screwed onto the bolt thread. In addition, onto the free end of the threaded head portion is screwed a threaded rod which extends beyond the bore of the sheet so that a nut can be secured to it. With this type of attachment, it is particularly disadvantageous if the construction requires several parts since it would be complicated to properly arrange them and to interconnect them. In addition, with such a design the bolt may break at the threaded portion because of the bending forces and the notch effect which will act thereon.

In accordance with the present invention there is provided an anchoring device or securing bolt which includes a collar portion located adjacent the tip and a shank portion which is elongated and constructed in the form of a bending spring element. When the device is used with a power setting tool, the collar portion is adapted to bear against a ledge portion of the hammer piston of the tool and the shank portion is accommodated within an elongated bore of the piston. Because the driving piston of the setting tool acts on the shoulder, there is no danger that the shank portion will be flexed or distorted. The same driving conditions exist for a bolt of this character as with short bolts. The shank portion of the securing device is not loaded during the driving procedure, and the driving force is taken up by the collar which also limits the extent of penetration. The construction of the invention is distinct from a bolt having a collar located centrally in respect to the length of the shank portion. Such a construction provides a protection for the securing bolt thread. With the present invention the collar is located adjacent the tip portion. By designing the shank portion as a bending spring element, it will deform elastically under the action of the bending forces which occur during the driving operation and during its anchoring life so that the danger of breaking will be greatly eliminated. In addition, by making the shank in the form of a bending element the remaining portion which is subjected to the heaviest stresses is formed of greater strength.

The securing device of the invention is advantageously designed so that the shank zone tapers conically from the collar toward the head or threaded portion. Because of this the shank zone is designed approximately as a support of equal strength and suitable for relatively great flexibility.

The shank at a location away from the collar is advantageously cylindrical and may widen conically toward the collar in the zone adjacent the collar. With such a construction the bolt is easier to manufacture and nevertheless correctly formed at the location of the possible stress. The collar is advantageously made to a greater diameter than the head or threaded portion in order that the hammer piston or drive piston of a setting tool may position itself for applying a driving force on the collar without interference by the head.

Accordingly, it is an object of the invention to provide an improved anchoring device which includes an elongated shank portion, a tip portion at one end of said shank portion having a collar which is adapted to be engaged by an end of a driving tool and a head portion at the opposite end of the shank portion from the tip portion which may advantageously be threaded and which is preferably of a dimension less than the diameter of the collar so that it will be adequately received within the bore of a driving piston of a setting tool.

A further object of the invention is to provide an anchoring device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
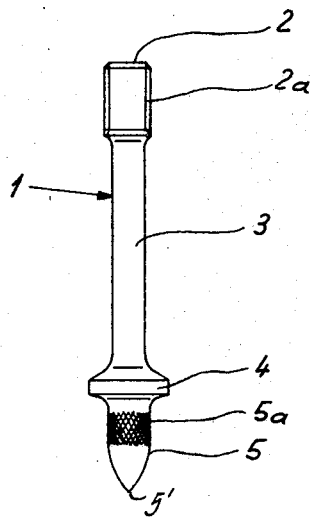
FIG. 1 is a side elevational view of an anchoring element constructed in accordance with the invention.

Referring to the drawings in particular, the invention embodied therein in FIG. 1 comprises an anchoring element or securing device generally designated 1 including a head portion 2 at one end with an external thread 2a, a bending shank portion or elongated shank 3, a collar portion or widened portion 4 and a tip portion 5 terminating in a point 5′. The tip portion 5 is provided with a knurling or roughening 5a. The shank portion 3 is cylindrical and widens conically toward the collar 4.

Figure 2:
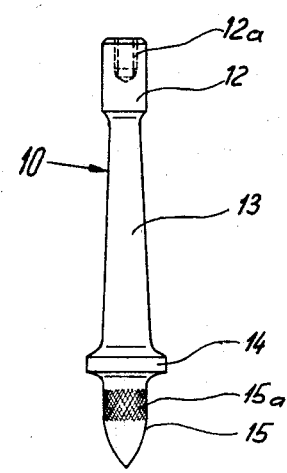
FIG. 2 is a view similar to FIG. 1 of another embodiment of the invention.

In the embodiment of the device indicated in FIG. 2, there is provided an anchoring element 10 having a head portion 12 provided with an internal portion 12a. A bending shank portion 13 widens conically from the head portion 12 toward a collar portion 14. The tip 15 is provided with a knurling 15a. Depending on its use, the knurling 15a may or may not be omitted.

Figure 3:
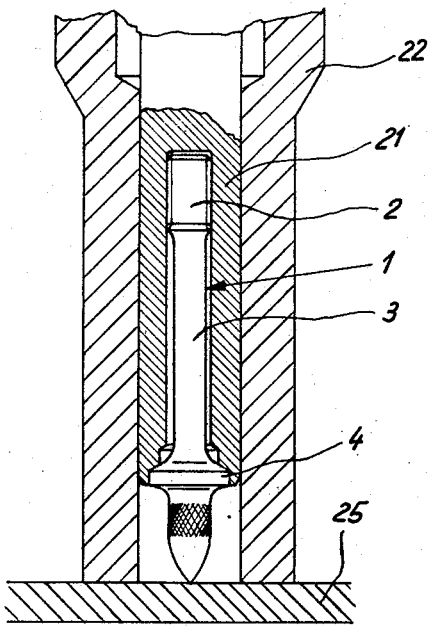
FIG. 3 is a partial sectional view of a setting tool having an anchoring device of the type indicated in FIG. 1 in a position for driving into a receiving material.
Figure 4:
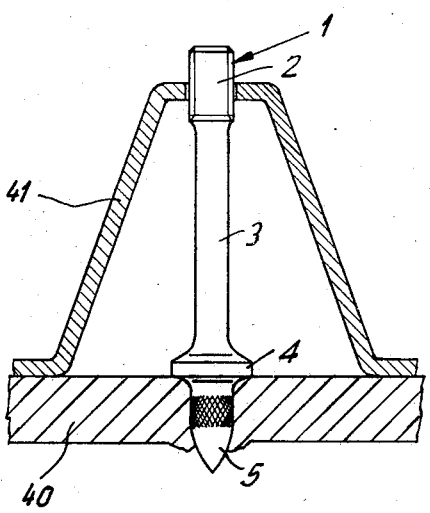
FIG. 4 is a sectional view of an anchoring element shown in an anchoring position after being set in a receiving material.

In FIG. 3 the anchoring element is shown in position in association with a power operated setting tool 22 which carries a reciprocal hammer piston or drive piston 21 which is moved by an explosive charge force to drive the anchoring device 1 into a receiving material such as a steel plate 25. A drive piston 21 is provided with an elongated central bore which accommodates the shank portion 3 and the head portion 2 of the anchoring device 1. A collar 4 abuts against a shoulder at the lower end of the bore and it is the collar that receives the driving force upon the movement of the drive piston 21. In addition, the collar serves as a limitation of the depth of penetration of the device into the material 25. The shank portion 3 and the head portion 2 are retained within the bore of the drive piston so that there is no danger of flexing. In FIG. 4 an anchoring element 1 is indicated in a fastened position secured to a steel plate 40, the tip 5 penetrating up to the depth of the collar 14. The anchoring element 1 extends through the crest portion of a corrugated wave 41 of a corrugated sheet which is anchored to the receiving material 40 such as by threading an element over the head portion 2.

What is claimed is:

1. A one piece anchoring element such as a bolt, nail or similar device formed of spring metal and comprising an enlarged head portion having attaching means thereon, an elongated shank portion connected to said head portion and a pointed tip portion connected to said shank portion, and a collar of greater diameter than said head portion formed between said shank portion and said tip portion, the shank portion being dimension so as to have at least a part thereof capable of resilient bending, the axial length of said shank portion being greater than the remainder of the length of said anchoring device.

2. An anchoring element, according to claim 1, wherein said shank portion widens in a conical manner toward the collar.

3. An anchoring element, according to claim 1, wherein said shank portion is cylindrical and widens conically toward said collar portion only in an area immediately adjacent said collar portion.

4. An anchoring element, according to claim 1, wherein said head portion is threaded.

5. An anchoring element, according to claim 1, wherein said tip is provided with a knurling.

6. An anchoring element, according to claim 1, wherein said head portion is threaded internally, said shank portion being tapered conically from said head portion to said collar portion.

References Cited

UNITED STATES PATENTS

| 2,103,155 | 12/1937 | Foulke | 102—92.1 |
|---|---|---|---|
| 2,724,116 | 11/1955 | Termet. | |
| 3,041,616 | 7/1962 | Henning et al. | |

FOREIGN PATENTS

| 60,575 | 4/1954 | France. |
|---|---|---|
| 1,099,960 | 2/1961 | Germany. |

RAMON S. BRITTS, Primary Examiner

U.S. Cl. X.R.

151—41.73